United States Patent Office 3,165,529
Patented Jan. 12, 1965

3,165,529
1,2-DI-SUBSTITUTED DIAZACYCLES
Herbert Morton Blatter, Millburn, N.J., assignor to Ciba Corporation, New York, N.Y., a corporation of Delaware
No Drawing. Filed Mar. 8, 1963, Ser. No. 263,715
10 Claims. (Cl. 260—309.6)

The present invention concerns 1,3-diaza-cycloalk-2-enes, more especially 1-Ph-2-aryl-1,3-diaza-cycloalk-2-enes, in which Ph is phenyl substituted by hydroxyl, phenyl substituted by etherified hydroxyl, and phenyl substituted by acyloxy, and aryl is a carbocyclic aryl radical, or a heterocyclic aryl radical, and in which the 1,3-diaza-cycloalk-2-ene portion has from five to seven ring members, and the tautomers thereof having the 1,3-diaza-cycloalk-3-ene ring system, and the salts of such compounds, as well as process for the preparation thereof.

More particularly, the invention relates to compounds of the formula

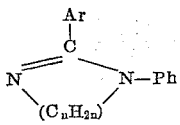

In which Ph is phenyl substituted by hydroxyl, phenyl substituted by etherified hydroxyl, and phenyl substituted by acyloxy, Ar is carbocyclic aryl, as well as heterocyclic aryl, and the group of the formula —$(C_nH_{2n})$— is alkylene having from two to seven carbon atoms and separating the two nitrogen atoms by two to four carbon atoms, and the tautomers thereof having a 1,3-diazo-cycloalk-3-ene ring system, and acid addition salts of such compounds.

The compounds of this invention have preferably the 1,3-diaza-cycloalk-2-ene ring system, but may also exist in the form of their tautomers having the 1,3-diaza-cycloalk-3-ene ring system.

A phenyl group representing Ph contains at least one or more than one hydroxyl, etherified hydroxyl or acyloxy group attached to any position available for substitution.

An etherified hydroxyl group is primarily an aliphatic etherified hydroxyl group, especially lower alkoxy having from one to seven carbon atoms, e.g. methoxy, ethoxy, n-propyloxy, isopropyloxy, n-butyloxy, isobutyloxy, secondary butyloxy, tertiary butyloxy, n-pentyloxy, isopentyloxy, neopentyloxy, n-hexyloxy, isohexyloxy, n-heptyloxy and the like. Other aliphatic etherified hydroxyl groups are, for example, lower alkenyloxy, e.g. allyloxy, methallyloxy, 2-butenyloxy and the like, as well as cycloaliphatic etherified hydroxyl groups, such as cycloalkyloxy, in which cycloalkyl has from three to eight, preferably from five to seven, carbon atoms, e.g. cyclopropyloxy, cyclopentyloxy, cyclohexyloxy, cycloheptyloxy and the like, or substituted aliphatic etherified hydroxyl groups, such as carbocyclic aryl-lower alkoxy, for example, phenyl-lower alkoxy, e.g. benzyloxy, 1-phenylethyloxy, 2-phenylethyloxy and the like, or cycloaliphatic-lower alkoxy, for example, cycloalkyl-lower alkoxy, in which cycloalkyl has from thre to eight, preferably from five to seven, carbon atoms, e.g. cyclopropylmethoxy, cyclopentylmethoxy, 2 - cyclopentylethoxy, cyclohexymethoxy, 1-cyclohexylethoxy, cycloheptylmethoxy and the like, or any other etherified hydroxyl group. Two neighboring hydroxyl groups may be etherified by a bivalent aliphatic radical and form, for example, a lower alkylenedioxy group, e.g. methylenedioxy and the like.

An acyloxy group is a hydroxyl group esterified with an organic acid, particularly an organic carboxylic acid, such as an aliphatic monocarboxylic acid, for example, a lower alkanoic acid, e.g. acetic, propionic, butyric, isobutyric, pivalic and the like, as well as a substituted aliphatic monocarboxylic acid, such as a cycloalkyl-lower alkanoic acid, e.g. cyclohexylacetic, β-cyclopentylpropionic acid and the like, a carbocyclic aryl-lower alkanoic acid, e.g. phenylacetic, β-phenylpropionic acid and the like, or an aryl carboxylic acid, such as a monocyclic carbocyclic aryl monocarboxylic acid, e.g. benzoic acid or substituted benzoic acid, for example, (lower alkyl)-benzoic acid (e.g. 4-methyl-benzoic, 4-ethyl-benzoic acid and the like), (lower alkoxy)benzoic acid (e.g. 4-methoxy-benzoic, 3,4,5-trimethoxy-benzoic, 2-ethoxy-benzoic acid and the like), or (halogeno)-benzoic acid (e.g. 3-fluoro-benzoic, 4-chloro-benzoic, 3,4-dichloro-benzoic, 4-bromo-benzoic acid and the like), or a monocyclic heterocyclic aryl monocarboxylic acid, such as pyridine carboxylic acid, e.g. nicotinic, isonicotinic acid and the like.

Apart from the hydroxyl, the etherified hydroxyl or acyloxy substituent, the group Ph may also have as substituents aliphatic hydrocarbon radicals, such as lower alkyl, e.g. methyl, ethyl, n-propyl, isopropyl and the like.

Preferred groups represented by Ph are (hydroxy)-phenyl, (etherified hydroxy)-phenyl, particularly (lower alkoxy)-phenyl, or (acyloxy)-phenyl, particularly (lower alkanoyloxy)-phenyl.

A carbocyclic aryl radical representing the aryl radical Ar is primarily monocyclic carbocyclic aryl, as well as bicyclic carbocyclic aryl. A monocyclic carbocyclic aryl radical is phenyl or substituted phenyl, whereas a bicyclic carbocyclic aryl radical is naphthyl, e.g. 1-naphthyl or 2-naphthyl, or substituted naphthyl; substituted phenyl or substituted naphthyl radicals may have one or more than one of the same or of different substituents attached to any of the positions available for substitution. Substituents of such carbocyclic aryl radicals are, for example, lower alkyl, e.g. methyl, ethyl, n-propyl, isopropyl, n-butyl, tertiary butyl and the like, or functional groups, such as, for example, hydroxyl, etherified hydroxyl, particularly lower alkoxy, e.g. methoxy, ethoxy, n-propyloxy, isopropyloxy, n-butyloxy, n-pentyloxy, isopentyloxy and the like, esterified hydroxyl, especially halogeno (representing hydroxyl esterified by a hydrohalic acid), e.g. fluoro, chloro, bromo and the like, as well as organic acyl-oxy, such as lower alkanoyl-oxy, e.g. acetyloxy, propionyloxy, pivalyloxy and the like, or any other suitable substituent.

Substituted phenyl radicals representing Ar are especially (lower alkyl)-phenyl, (hydroxy)-phenyl, (etherified hydroxy)-phenyl, especially (lower alkoxy)-phenyl, (esterified hydroxy) - phenyl, especially (halogeno)-phenyl, as well as (lower alkanoyloxy)-phenyl, or any other substituted phenyl group, whereas preferred substituted naphthyl radicals are the correspondingly substituted 1-naphthyl and 2-naphthyl radicals.

An aryl group representing Ar may also stand for a heterocyclic aryl radical, which is represented by monocyclic heterocyclic aryl, particularly monocyclic azacyclic aryl, such as pyridyl, e.g. 2-pyridyl, 3-pyridyl or 4-pyridyl, as well as pyridazinyl, e.g. 3-pyridazinyl or 4-pyridazinyl, pyrimidyl, e.g. 2-pyrimidyl, 4-pyrimidyl or 5-pyrimidyl, pyrazinyl, e.g. 2-pyrazinyl, as well as monocyclic oxacyclic aryl, such as furyl, e.g. 2-furyl and the like, or monocyclic thiacyclic aryl, such as thienyl, e.g. 2-thienyl and the like. Other heterocyclic aryl radicals are bicyclic heterocyclic aryl radicals, such as bicyclic azacyclic aryl, for example, quinolinyl, e.g. 2-quinolinyl, 4-quinolinyl and the like, isoquinolinyl, e.g. 1-isoquinolinyl and the like, or other analogous bicyclic heterocyclic aryl radicals.

As mentioned above, the 1,3-diaza-cycloalk-2-ene radical has from five to seven ring members. The alkylene radical of the formula —$(C_nH_{n2})$—, having from two to seven carbon atoms, separates the two nitrogen atoms by two to four carbon atoms; its carbon atoms may be unsubstituted or contain one or more than one lower alkyl groups as substituents, e.g. methyl, ethyl, n-propyl, iso-propyl and the like. The group of the formula

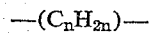

may be represented by 1,2-ethylene, 1,3-propylene or 1,4-butylene, as well as by 1,2-propylene, 1,2-butylene, 2,3-butylene, 1,3-butylene, 2-methyl-1,2-propylene, 1,4-pentylene and the like.

Salts of the compounds of this invention are acid addition salts, such as the pharmaceutically acceptable, non-toxic acid addition salts with an inorganic acid, e.g. hydrochloric, hydrobromic, nitric, sulfuric, phosphoric acids and the like, or with an organic acid, such an organic carboxylic acid, e.g. acetic, glycolic, maleic, hydroxymaleic, fumaric, malic, tartaric, citric, benzoic, salicylic, 4-aminosalicylic, 2-acetoxybenzoic, nicotinic, isonicotinic acid and the like, or an organic sulfonic acid, e.g. methane sulfonic, ethane sulfonic, 2-hydroxyethane sulfonic, benzene sulfonic, toluene sulfonic, 2-naphthalene sulfonic acid and the like. Other acid addition salts may be useful as intermediates, for example, in the manufacture of acid addition salts, such as the pharmaceutically acceptable acid addition salts, or in the purification of the free compound, as well as for identification and characterization purposes. Salts which are primarily used for identification are particularly those with acidic organic nitro compounds, e.g. picric, picrolonic or flavianic acid, or with metal complex acids, e.g. phosphotungstic, phosphomolybdic, chloroplatinic or Reinecke acid.

The compounds of this invention have diuretic and natriuretic properties without causing significant potassium excretion, and can, therefore, be used as diuretic and natriuretic agents in the treatment of excessive water and salt retention, due to heart insufficiency, kidney diseases and the like, or are useful intermediates for the preparation of the pharmacologically active compounds.

Particularly useful as diuretic and natriuretic agents or as intermediates for the preparation of active compounds are the compounds of the formula

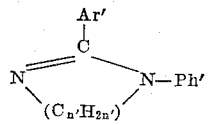

in which Ph′ is (hydroxy)-phenyl or (lower alkoxy)-phenyl, and Ar′ is monocyclic carbocyclic aryl group, especially phenyl, as well as (lower alkyl)-phenyl, (hydroxy)-phenyl, (lower alkoxy)-phenyl, or (halogeno)-phenyl, and the group of the formula —$(C_{n'}H_{2n'})$— is alkylene having from two to four carbon atoms and separating the two nitrogen atoms by two to three carbon atoms, as well as the tautomers thereof having the 1,3-diaza-cycloalk-3-ene ring system, and acid addition salts thereof; these compounds are above all represented by those having the formula

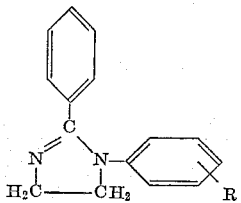

in which R is hydroxyl or lower alkoxy, and the acid addition salts thereof.

The compounds of this invention may be used in the form of compositions for enteral or parenteral use, which contain the new compounds or the salts thereof in admixture with an organic or inorganic, solid or liquid carrier. For making up the preparations, there can be employed substances which do not react with the new compounds, such as water, gelatine, lactose, starches, stearic acid, magnesium sterate, talc, vegetable oils, benzyl alcohols, stearyl alcohol, gums, tragacanth, propylene glycol, polyalkylene glycols or any other useful carrier for pharmaceutical preparations. The latter may be in solid form, for example, as capsules, tablets, dragees, suppositories and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. The may also contain, in combination, other useful substances.

The compounds of this invention may be prepared according to methods known per se. A preferable procedure comprises removing the elements of an acid from an N′-(reactive esterified hydroxy-alkyl)-N-(Ph$_0$)-aryl-amidine, in which alkyl separates the reactive esterified hydroxyl group from the nitrogen by two to four carbon atoms, aryl has the previously-given meaning, and Ph$_0$ is phenyl substituted by etherified hydroxyl, and phenyl substituted by acyloxy, particularly from a compound of the formula

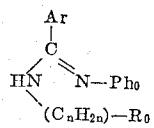

in which Ph$_0$, Ar, and the group of the formula

have the previously-given meaning, and R$_0$ is a reactive esterified hydroxyl group and is separated from the nitrogen by two to four carbon atoms, or a salt thereof, and, if desired, converting a resulting salt into the free compound or into another salt, and/or, if desired, converting a resulting compound into a salt thereof, and/or, if desired, converting in a resulting compound having an etherified hydroxyl group or an acyloxy group, such group into a hydroxyl group.

In the above starting materials, R$_0$ is primarily halogeno (representing a hydroxyl group esterified by a hydrohalic acid), e.g. chloro, bromo and the like, as well as an organic sulfonyloxy group, e.g. methyl-sulfonyloxy, p-methyl-phenyl-sulfonyloxy and the like. The starting material is preferably used in the form of an acid addition salt thereof.

The above reaction is carried out according to known methods; preferably the starting material is treated with a basic reagent. Basic reagents capable of bring about the desired removal of the elements of an acid, such as a hydrohalic acid or an organic sulfonic acid and the like, from the starting material are, for example, an alkali metal hydroxide or an alkaline earth metal hydroxide, e.g. lithium hydroxide, sodium hydroxide, potassium hydroxide, calcium hydroxide and the like (used in an aqueous or alcoholic, e.g., methanolic, ethanolic and the like, solution), ammonia (preferably in an aqueous or alcoholic solution), a strong organic base, such as a quaternary ammonium hydroxide, e.g. benzyl trimethyl ammonium hydroxide and the like, or a strong amine, e.g. N,N,N-trimethylamine, N,N,N-triethylamine and the like, or any other suitable basic reagent. In case the starting material is used in the form of its acid addition salt, an excess of the basic reagent is used. Usually, the reaction is carried out at room temperature; if necessary, the reaction mixture may be cooled or heated, and the reaction may be performed in a closed vessel and/or in the atmosphere of an inert gas, e.g. nitrogen.

The starting materials are prepared according to known methods; for example, an N-(reactive esterified hydroxy-alkyl)-N-(aryl-carbonyl)-amine, in which aryl has the previously-given meaning, and alkyl separates the reactive esterified hydroxyl group from the nitrogen by two to four carbon atoms, especially a compound of the formula

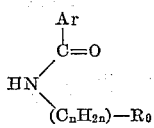

in which Ar, R₀ and the group of the formula

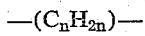

have the previously-given meaning, when reacted with a suitable halogenating reagent, e.g. phosphorus pentachloride, phosphorus tribromide, thionyl chloride and the like, yields an N-(α-halogeno-arylmethyl)-N-(reactive esterified hydroxy-alkyl)-imine, in which aryl has the previously-given meaning, and alkyl separates the reactive esterified hydroxyl group from the nitrogen by two to four carbon atoms, particularly a compound of the formula

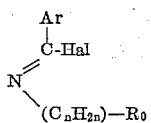

in which Ar, R₀ and the group of the formula

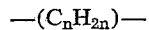

have the previously-given meaning, and Hal is halogeno, e.g. chloro and the like; upon treatment with a compound of the formula Ph₀—NH₂, in which P₀ has the above-given meaning, this compound is converted into the starting material.

In the above preparation of the starting material, the latter may not have to be isolated; thus, upon treatment of the N-(α-halogeno-arylmethyl)-N-(reactive esterified hydroxy-alkyl)-imine with a compound of the formula Ph₀—NH₂, the desired final product may be obtained without isolating the resulting starting material, particularly if the latter in its crude state is treated with a basic reagent.

Specific starting materials, i.e. N'-(2-reactive esterified hydroxy-ethyl) - N - (Ph₀)-aryl-amidine compounds may also be prepared very conveniently by reacting an N-(Ph₀)-arylimidoyl halide, in which Ph₀ has the previously-given meaning, particularly a compound of the formula

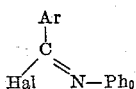

in which Ar, Ph₀ and Hal have the previously-given meaning, with an aziridine compound to form an 1-[α-(N-Ph₀-imino)-aryl-methyl]-aziridine compound, in which Ph₀ has the previously-given meaning, particularly a compound of the formula

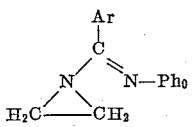

in which Ph₀ has the previously-given meaning; upon treatment with a suitable inorganic acid, e.g. hydrochloric acid, hydrobromic acid and the like, or an organic acid, e.g. p-toluene sulfonic acid and the like, such compound is converted into the desired salt of the N'-(2-reactive esterified hydroxyethyl)-N-(Ph₀)-aryl amidine, in which Ph₀ has the previously-given meaning, and in which the hydroxyl group is esterified with the acid used for the cleavage of the aziridine ring, and, if desired, may be converted into another reactive esterified hydroxyl group.

In a resulting compound, an etherified hydroxyl group or an acyloxy group may be converted into the free hydroxyl group according to per se conventional methods. Thus, an etherified hydroxyl group, such as lower alkoxy or phenyl-lower alkoxy may be converted into hydroxyl by acidic hydrolysis, for example, with hydrobromic acid in the presence of acetic acid and the like. Furthermore, an etherified hydroxyl group capable of being split by hydrogenolysis, e.g. a benzyloxy group and the like, may be converted into hydroxyl by treatment with catalytically activated hydrogen. An acyloxy group, such as lower alkanoyloxy and the like, when treated with a suitable base, such as an alkali metal hydroxide, is hydrolized to the free hydroxyl group.

The compounds of this invention may also be prepared, for example, by reacting an N-(Ph)-alkylene-diamine, in which Ph has the previously-given meaning, and the two nitrogen atoms are separated by two to four carbon atoms, such as a compound of the formula

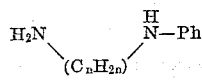

in which Ph and the group of the formula —(CₙH₂ₙ)— have the previously-given meaning, or a salt thereof, with an aryl carboxylic acid, particularly with a compound of the formula

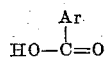

in which Ar has the previously-given meaning, or a reactive functional derivative thereof, and, if desired, converting the resulting compound into a salt thereof, and/or, if desired, converting a salt into the free compound or into another salt, and/or, if desired, converting in a resulting compound having an etherified hydroxyl group or an acyloxy group, such group into a hydroxyl group, and/or, if desired, converting in a resulting compound a free hydroxyl group into an etherified hydroxyl group or into an acyloxy group.

The above reaction is carried out according to known methods; preferably the group Ph is a phenyl group substituted by etherified hydroxy or acyloxy, i.e. is the group Ph₀. For example, about one mole of the N-(Ph)-alkylene-diamine starting material may be reacted with at least two moles of the aryl carboxylic acid at an elevated temperature (approximately at 250° to 300° C.) to yield the desired product; the latter may also be obtained by heating equivalent amounts of the two reactants in the presence of a diluent, e.g. benzene and the like, and azeotropically distilling off water. An N-(Ph)-alkylene-diamine starting material may also be reacted with a functionally converted aryl carboxylic acid to be converted into the desired product. Suitable functionally converted aryl carboxylic acids are, for example, an aryl thiocarboxylic acid amide, a lower alkyl aryl carboximidate, a lower alkyl aryl orthoester and the like, which reagents are reacted with the N-(Ph)-alkylene-diamine starting material under mild conditions. A salt of an N-(Ph)-alkylene-diamine, such as its mono- or bis-p-toluene sulfonate and the like, may be reacted with an aryl-nitrile, another functionally converted derivative of an aryl carboxylic acid, at an elevated temperature (for example, at 200° to 250° C.), and yield the desired product.

The above reaction may also be carried out in several steps; for example, an N-(Ph₀)-alkylene-diamine, in which Ph₀ has the previously-given meaning, may first be reacted with a suitable functional derivative of an aryl carboxylic acid, such as the anhydride or a halide, e.g. chloride and the like, thereof to form an N-(Ph₀)-alkylene-diamine, in which one or both nitrogen atoms are substituted with an aryl-carbonyl group; a resulting N-acyl-N-(Ph₀)-alkylene-diamine compound is then heated in the presence of a suitable reagent, such as calcium oxide and the like, to form the desired product. Furthermore, the alkali metal salt of an N-(Ph₀)-aryl-carboxamide, in which Ph₀ has the previously-given meaning, is reacted with a halogeno-alkano-nitrile, in which halogeno is separated from the cyano group by one to three carbon atoms, and the resulting N-(aryl-carbonyl)-N-(Ph₀)-amino-alkano-nitrile, in which Ph₀ has the previously-given meaning, and the nitrile group is separated from the amino group by one to three carbon atoms, is treated with a suitable reducing reagent, such as catalytically activated hydrogen using as a catalyst a hydrogenation catalyst containing a metal of the eighth group of the Periodic System, e.g. nickel, palladium and the like; the hydrogenation reaction is carried out in the presence of a solvent, if necessary, under pressure and/or at an elevated temperature.

The starting materials used in the above reaction are known or are prepared according to methods known per se.

In a resulting compound a free hydroxyl group may be converted into an etherified hydroxyl group according to etherification methods known per se, for example, by forming an alkali metal salt and reacting it with a reactive ester of an alcohol, or into an acyloxy group using known esterification methods, such as treatment with an organic acid halide or anhydride in the presence of a base.

The compounds of this invention may also be prepared by reacting a lower alkyl N-(Ph₀)-aryl carboximidate, in which Ph₀ and aryl have the previously-given meaning, particularly a compound of the formula

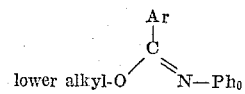

in which Ar and Ph₀ have the previously-given meaning, with a reactive esterified hydroxy-alkyl-amine, in which alkyl separates the reactive esterified hydroxyl group from the nitrogen by two to four carbon atoms, especially a compound of the formula

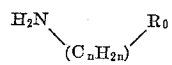

in which R₀ and the group of the formula —(CₙH₂ₙ)— have the previously-given meaning, and, if desired, carrying out the optional steps.

Lower alkyl in the above starting material represents methyl, ethyl, isopropyl and the like, whereas a reactive esterified hydroxyl group is halogeno, e.g. chloro, bromo and the like, as well as organic sulfonyloxy, e.g. methylsulfonyloxy, p-methyl-phenylsulfonyloxy and the like.

The above reaction is carried out, for example, by heating, if necessary, in the presence of a suitable base, such as an alkali metal lower alkoxide, e.g. sodium ethoxide and the like, and of a suitable diluent, such as a lower alkanol, e.g. ethanol and the like, if necessary, while heating, and/or in a closed vessel, and/or in the atmosphere of an inert gas, e.g. nitrogen.

The starting material is known or may be prepared according to known methods; for example, a lower alkyl N-(Ph₀)-aryl-carboximidate may be obtained by reacting an N-(Ph₀)-aryl imidoyl halide, in which Ph₀ has the previously-given meaning, with a lower alkanol or with an alkali metal lower alkoxide.

A resulting acid addition salt may be converted into the free compound by treatment with an alkaline reagent, such as a metal hydroxide, e.g. lithium hydroxide, sodium hydroxide, potassium hydroxide, calcium hydroxide, and the like, a metal carbonate, e.g. sodium, potassium or calcium carbonate or hydrogen carbonate and the like, ammonia, or any other suitable reagent, such as a hydroxyl ion exchange preparation.

A resulting acid addition salt may be converted into another salt; for example, an acid addition salt with an inorganic acid may be reacted with a suitable metal, e.g. sodium, barium, silver and the like, salt of an acid in the presence of a solvent in which a resulting inorganic compound is insoluble and is thus removed from the reaction medium. The conversion of one salt into another may also be achieved by treatment with an anion exchange preparation.

A free compound may be converted into its acid addition salt by reacting it, preferably a solution thereof in a solvent or solvent mixture, with an acid or a solution thereof, or with an anion exchange preparation, and isolating the desired salt. The latter may be obtained in the form of a hydrate thereof or may contain solvent of crystallization.

The invention also comprises any modification of the process wherein a compound formed as an intermediate at any stage of the process of this invention is used as starting material and the remaining step(s) of the process is(are) carried out, as well as any new intermediates.

In the process of this invention those starting materials are preferably used which lead to the final products mentioned in the beginning as the preferred embodiments of the invention.

The following examples are intended to illustrate the invention and are not to be construed as being limitations thereon. Temperatures are given in degrees centigrade.

*Example 1*

To a solution of 1.0 g. of 1-{α-[N-(4-benzyloxyphenyl)-imino]-benzyl}-aziridine in 200 ml. of diethyl ether is added dropwise a concentrated solution of hydrogen chloride gas in isopropanol until the precipitation is complete. The solid material, representing the hydrochloride of N'-(2-chloroethyl) - N - (4-benzyloxy-phenyl)-phenyl-amidine, is filtered off and rapidly dissolved in 100 ml. of water. A solution of 0.3 g. of sodium hydroxide in 5 ml. of water is added, whereupon an oil is formed, which is extracted into diethyl ether. The organic solution is dried over magnesium sulfate and evaporated; the oily residue crystallizes and is recrystallized from hexane using a charcoal preparation for decolorization. A total of 0.43 g. of 1-(4-benzyloxy-phenyl)-2-phenyl-2-imidazoline of the formula

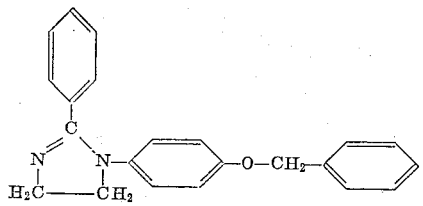

is obtained; the analytical sample melts at 88–90° after recrystallization from hexane.

The starting material used in the above procedure is prepared as follows: To a solution of 60.0 g. of 4-benzyloxy-aniline in 150 ml. of pyridine is slowly added 42.0 g. of benzoyl chloride while cooling. The reaction mixture is stirred and then poured into about 2,000 ml. of water; the solid material is filtered off, and is purified by boiling in ethanol, to yield 80.0 g. of the N-(4-benzyloxy-phenyl)-benzoic acid amide, which melts at 235–236.5° after recrystallization from acetone.

A mixture of 10.0 g. of N-(4-benzyloxy-phenyl)-benzoic acid amide and 15 ml. of thionyl chloride is refluxed for five hours. The excess of thionyl chloride is evaporated under reduced pressure, and the residue is recrystallized from hexane to yield 6.5 g. of the N-4-benzyloxy-phenyl)-benzimidoyl chloride, which melts at 112–115° after further recrystallization from hexane.

To a solution of 6.44 g. of N-(4-benzyloxy-phenyl)-benzimidoyl chloride in 50 ml. of pyridine is added 0.86 g. of ethylene imine while cooling. The exothermic reaction is interrupted by pouring the mixture into 500 ml. of water before it turns dark. On standing overnight, a solid precipitate is formed, which is collected, dried and recrystallized from hexane with charcoal decolorization. The desired 1-{α-[N-(4-benzyloxy-phenyl)-imino]-benzyl}-aziridine (yield: 3.7 g.) melts at 95–97° after several recrystallizations from hexane.

*Example 2*

A solution of 1.09 g. of 1-(4-benzyloxy-phenyl)-2-phenyl-2-imidazoline in 50 ml. of absolute ethanol is treated with hydrogen at atmospheric pressure in the presence of 0.5 g. of a palladium catalyst (10 percent palladium on charcoal). The hydrogenolysis is interrupted after the theoretical amount of hydrogen has been absorbed (about 16 minutes). The catalyst is filtered off, and the filtrate is evaporated to dryness under reduced pressure to yield 0.54 g. of 1-(4-hydroxy-phenyl)-2-phenyl-2-imidazoline of the formula

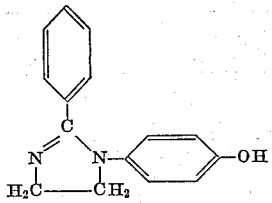

which melts at 254–257° after several recrystallizations from acetone.

Example 3

A mixture of 5.8 g. of phosphorus pentachloride in 40 ml. of benzene is treated with 5.0 g. of N-(2-chloroethyl)-benzoic acid amide, followed by the dropwise addition of 3.4 g. of 3-methoxy-aniline. The reaction mixture is refluxed for three hours, and, after standing at room temperature overnight, is evaporated to dryness under reduced pressure. The remaining yellow oil, representing probably the N'-(2-chloroethyl)-N-(3-methoxy-phenyl)-phenyl-amidine hydrochloride, is dissolved in water; the aqueous solution is boiled with charcoal, filtered and made basic with a concentrated aqueous solution of ammonium hydroxide. An oil separates, which is extracted with methylene chloride; the organic solution is washed with water and then dried over anhydrous sodium sulfate. The solvent is evaporated to dryness to yield a yellow oil, which is dissolved in diethyl ether. On adding a concentrated solution of hydrogen chloride in isopropanol, a solid material is formed which is collected and recrystallized from a mixture of methanol and diethyl ether to yield 0.96 g. of 1-(3-methoxy-phenyl)-2-phenyl-2-imidazoline hydrochloride of the formula

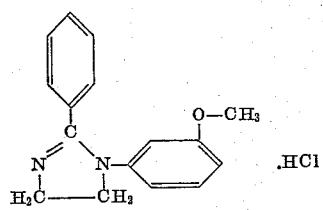

the salt melts at 206–207° after recrystallization from a mixture of ethanol and diethyl ether.

Other compounds prepared according to the above procedure by selecting the appropriate starting materials, are, for example, 1-(2-methoxy-phenyl)-2-phenyl-2-imidazoline hydrochloride, M.P. 243–244° after recrystallization from a mixture of ethanol and diethyl ether;

1-(4-methoxy-phenyl)-2-phenyl-2-imidazoline hydrochloride, M.P. 219–221° after recrystallization from a mixture of methanol and diethyl ether;

as well as 1,2-di-(4-hydroxy-phenyl)-2-imidazoline,
1-(4-ethoxy-phenyl)-2-phenyl-2-imidazoline,
1-(3,4,5-trimethoxy-phenyl)-2-phenyl-2-imidazoline,
1-(4-allyloxy-phenyl)-2-phenyl-2-imidazoline,
1-(4-cyclohexyloxy-phenyl)-2-phenyl-imidazoline,
2-(4-chloro-phenyl)-1-(4-methoxy-phenyl)-2-imidazoline,
1,2-di-(4-methoxyphenyl)-imidazoline,
2-(4-methyl-phenyl)-1-(4-n-propyloxy-phenyl)-2-imidazoline,
1-(3-hydroxy-phenyl)-4-methyl-2-(2-pyridyl)-2-imidazoline,
1-(4-acetyloxy-phenyl)-2-phenyl-2-imidazoline,
1-(4-hydroxy-phenyl)-2-phenyl-1,4,5,6-tetrahydro-pyrimidine,
1-(4-benzyloxy-phenyl)-2-phenyl-1,4,5,6-tetrahydro-pyrimidine,
1-(4-methoxy-phenyl)-2-phenyl-1,4,5,6-tetrahydro-pyrimidine,
1,2-di-(4-methoxy-phenyl)-1,4,5,6-tetrahydro-pyrimidine,
1-(4-ethoxy-phenyl)-5-methyl-2-phenyl-1,4,5,6-tetrahydro-pyrimidine,
1-(4-propionyloxy-phenyl)-2-(4-methyl-phenyl)-1,4,5,6-tetrahydro-pyrimidine,
1-(4-methoxy-phenyl)-2-phenyl-1,3-diaza-2-cycloheptene,
1-(4-hydroxy-phenyl)-2-phenyl-1,3-diaza-2-cycloheptene and the like, or the salts, such as the hydrochlorides thereof.

What is claimed is:

1. A member selected from the group consisting of compounds of the formula

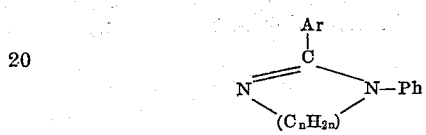

in which Ph is a member selected from the group consisting of phenyl substituted by hydroxyl, phenyl substituted by lower alkoxy, phenyl substituted by lower alkenyloxy, phenyl substituted by cycloalkyloxy, in which cycloalkyl has from three to eight carbon atoms, phenyl substituted by phenyl-lower alkoxy, and phenyl substituted by lower alkanoyloxy, Ar is a member selected from the group consisting of phenyl, (lower alkyl)-phenyl, (hydroxy)-phenyl, (lower alkoxy)-phenyl, (halogeno)-phenyl and pyridyl, and the group of the formula —$(C_nH_{2n})$— is alkylene having from two to seven carbon atoms and separating the two nitrogen atoms by two to four carbon atoms, and the pharmaceutically acceptable acid addition salts of such compounds.

2. A compound of the formula

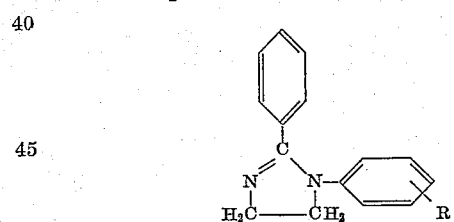

in which R is lower alkoxy.

3. A pharmaceutically acceptable acid addition salt of a compound of the formula

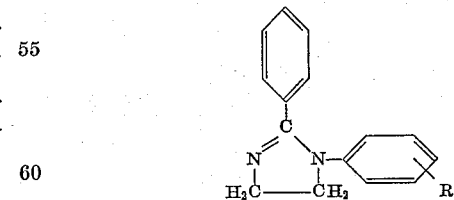

in which R is lower alkoxy.

4. A compound of the formula

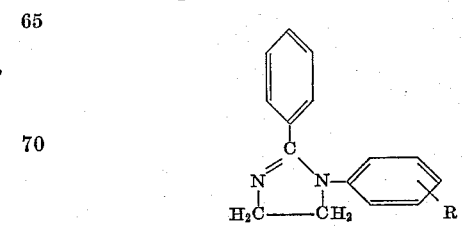

in which R is hydroxyl.

5. A pharmaceutically acceptable acid addition salt of a compound of the formula

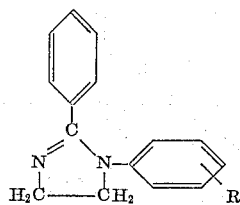

in which R is hydroxyl.
6. 1-(4-benzyloxy-phenyl)-2-phenyl-2-imidazoline.
7. 1-(4-hydroxy-phenyl)-2-phenyl-2-imidazoline.
8. 1-(3-methoxy-phenyl)-2-phenyl-2-imidazoline.
9. 1-(4-methoxy-phenyl)-2-phenyl-2-imidazoline.
10. 1-(2-methoxy-phenyl)-2-phenyl-2-imidazoline.

References Cited in the file of this patent

UNITED STATES PATENTS

| | | |
|---|---|---|
| 2,569,415 | Hartmann et al. | Sept. 25, 1951 |
| 2,658,895 | Ballard et al. | Nov. 10, 1953 |
| 2,836,566 | Novello | May 12, 1959 |
| 2,899,441 | Dornfeld | Aug. 11, 1959 |
| 3,004,983 | Loev | Oct. 17, 1961 |
| 3,029,236 | Staeuble et al. | Apr. 10, 1962 |

OTHER REFERENCES

Partridge et al.: Jour. Chem. Soc. (London) 1949, pp. 1308–1310.

Hackh's Chemical Dictionary, Third Edition, page 18, Philadelphia, Blakeston, 1944.

Katritzky et al.: Heterocyclic Chemistry, pages 17–19, New York, Wiley, 1960.

Fieser et al.: Topics in Organic Chemistry, pages IX–X (contents), 59–60, 71–72, and 98–104, New York, Reinhold, (Mar. 5, 1963).